(12) United States Patent
Ishizu et al.

(10) Patent No.: US 9,958,763 B2
(45) Date of Patent: May 1, 2018

(54) PROJECTION DEVICE, PROJECTION CONTROL METHOD, AND STORAGE MEDIUM, SUITABLE FOR PROJECTOR OR THE LIKE USING SEMICONDUCTOR LIGHT-EMITTING ELEMENT AS LIGHT SOURCE

(71) Applicant: CASIO COMPUTER CO., LTD., Shibuya-ku, Tokyo (JP)

(72) Inventors: Takeo Ishizu, Higashimurayama (JP); Toshiharu Arai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 115 days.

(21) Appl. No.: 15/040,669

(22) Filed: Feb. 10, 2016

(65) Prior Publication Data
US 2016/0274448 A1    Sep. 22, 2016

(30) Foreign Application Priority Data

Mar. 20, 2015   (JP) ................................ 2015-058434

(51) Int. Cl.
G03B 21/20    (2006.01)
G03B 33/08    (2006.01)

(52) U.S. Cl.
CPC ......... *G03B 21/206* (2013.01); *G03B 21/204* (2013.01); *G03B 33/08* (2013.01)

(58) Field of Classification Search
CPC ............... G03B 21/008; G03B 21/206; G03B 21/2013; G03B 21/2053; H04N 9/3114; H04N 9/3117; H04N 9/3155; H04N 9/3161; H04N 9/3194
See application file for complete search history.

(56) References Cited

U.S. PATENT DOCUMENTS

| 8,803,447 B2* | 8/2014 | Nakamura | H05B 37/02 315/224 |
| 2009/0103053 A1* | 4/2009 | Ichikawa | H04N 5/7458 353/33 |
| 2013/0033651 A1* | 2/2013 | Haraguchi | H04N 9/3155 348/744 |
| 2013/0201408 A1* | 8/2013 | Murai | H04N 9/31 348/744 |

FOREIGN PATENT DOCUMENTS

JP    2014164289 A    9/2014

* cited by examiner

*Primary Examiner* — Sultan Chowdhury
(74) *Attorney, Agent, or Firm* — Holtz, Holtz & Volek PC

(57) ABSTRACT

A projection device includes a semiconductor light-emitting element, a rotary wheel configured to emit lights of a plurality of colors in a time-division manner by using light which the semiconductor light-emitting element emits, and a controller configured to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state.

6 Claims, 3 Drawing Sheets

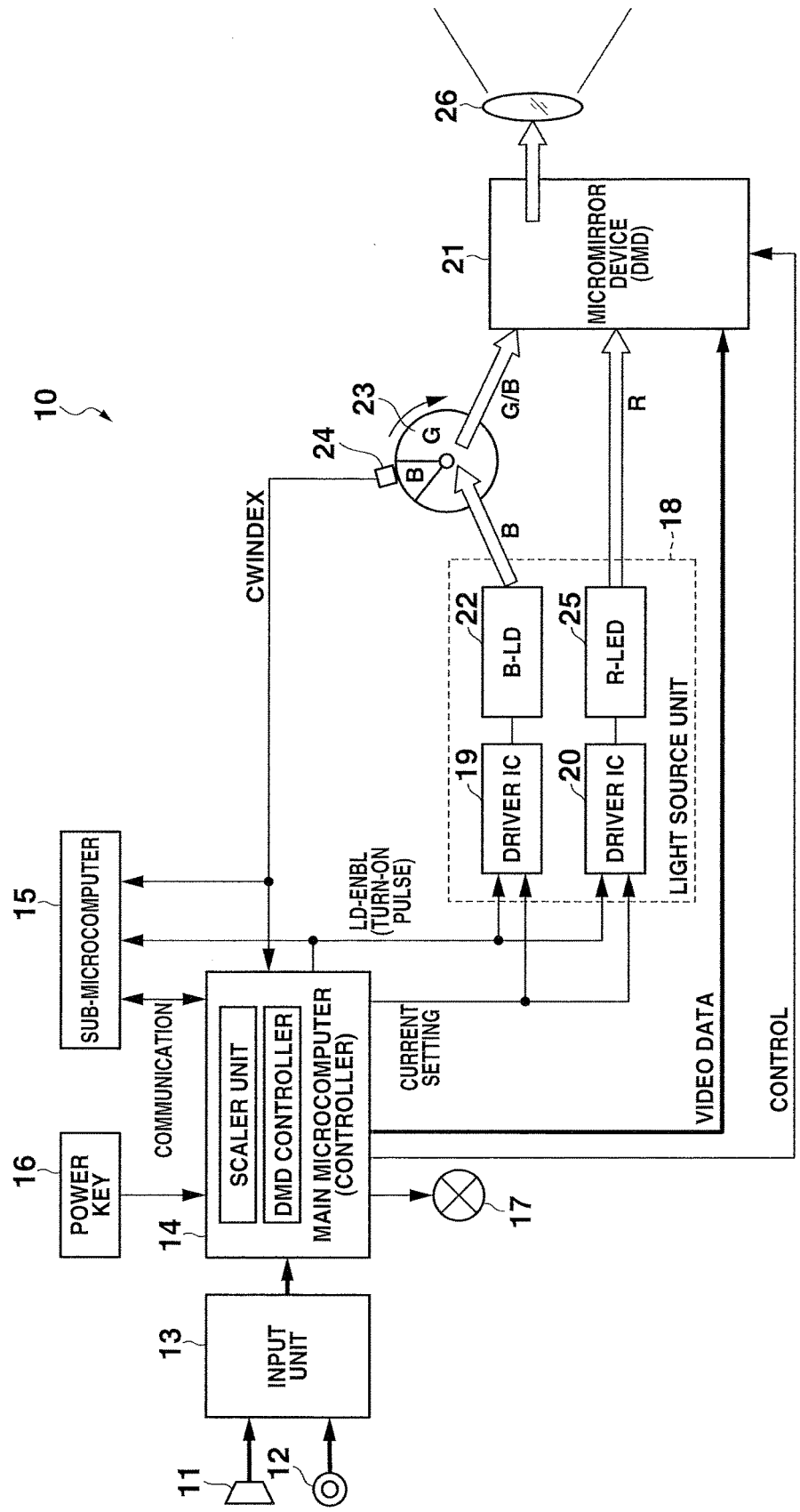

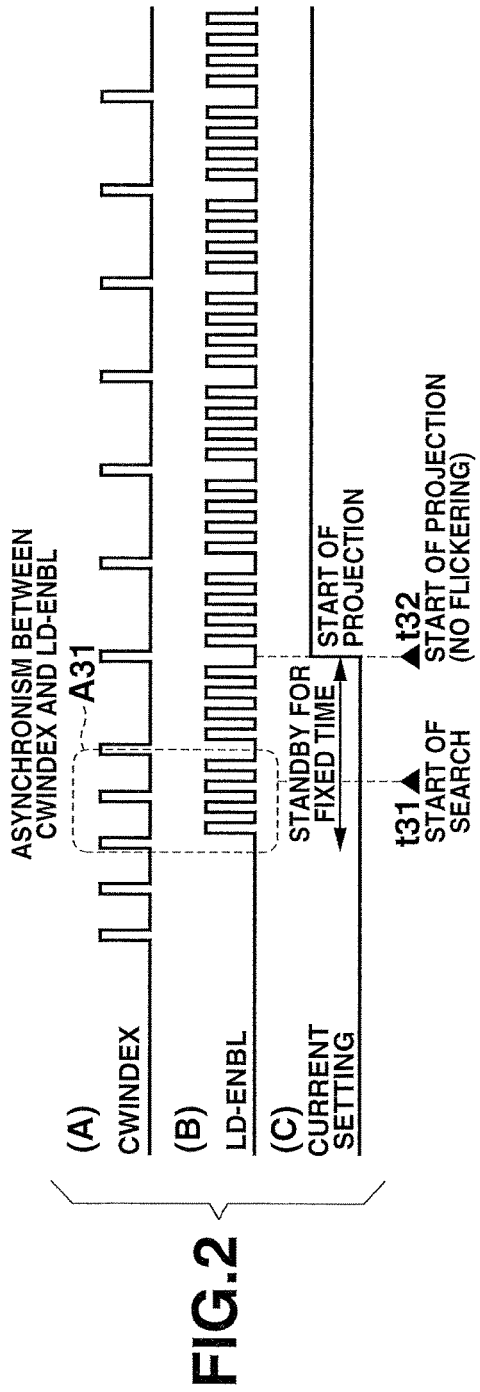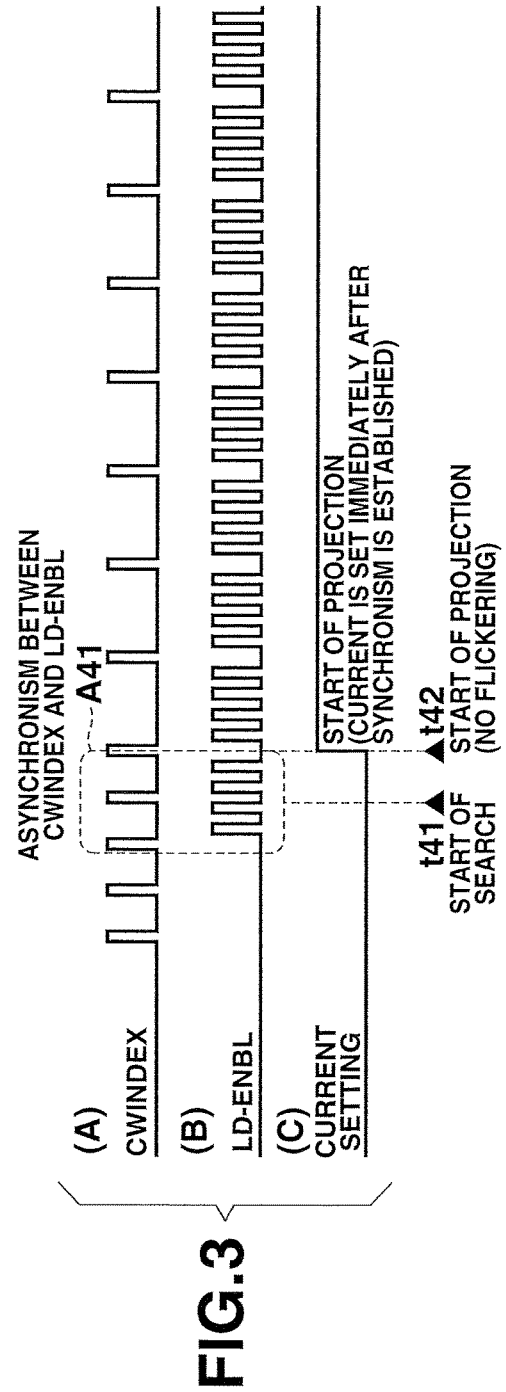

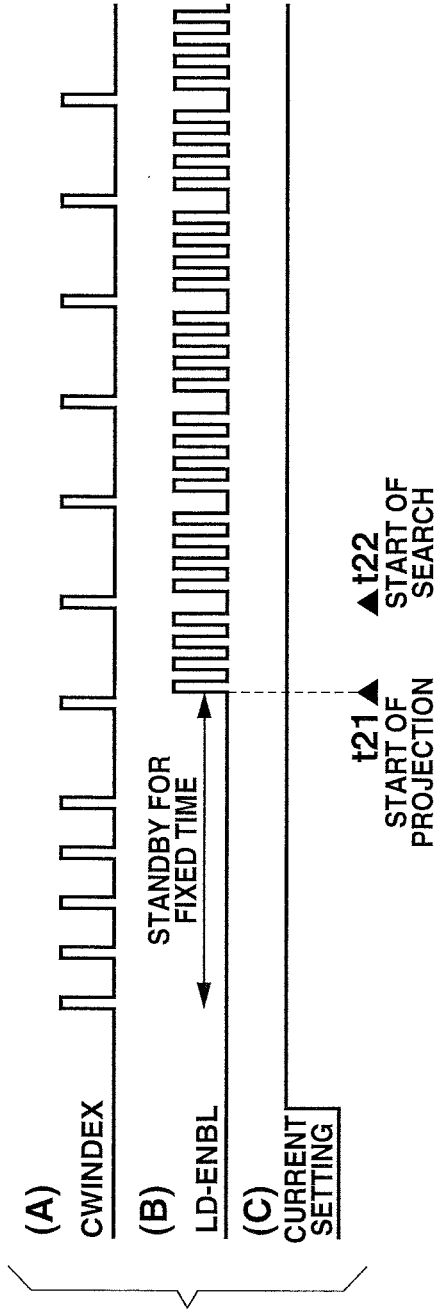

PROJECTION DEVICE, PROJECTION CONTROL METHOD, AND STORAGE MEDIUM, SUITABLE FOR PROJECTOR OR THE LIKE USING SEMICONDUCTOR LIGHT-EMITTING ELEMENT AS LIGHT SOURCE

CROSS-REFERENCE TO RELATED APPLICATIONS

This application is based upon and claims the benefit of priority from Japanese Patent Application No. 2015-058434, filed Mar. 20, 2015, the entire contents of which are incorporated herein by reference.

BACKGROUND OF THE INVENTION

1. Field of the Invention

The present invention relates to a projection device, a projection control method, and a storage medium, suitable for a projector or the like using a semiconductor light-emitting element as a light source.

2. Description of the Related Art

Recently, various kinds of projector devices, which employ semiconductor light-emitting elements, such as a light-emitting diode (LED) or a semiconductor laser (LD), as light sources, have been commercialized. In such kinds of projector devices, a semiconductor element, which directly emits G light with a light amount substantially equal to the light amount of each of R light and B light, among R (red) light, G (green) light and B (blue) light of the three primary colors, has not yet been put to practical use. Under the circumstances, B light, which is emitted from an LD, is radiated onto a phosphor wheel that is coated with a phosphor, and G light obtained from the phosphor is collected and utilized.

The above-described phosphor wheel is configured such that a part of a plate surface, on which B light is radiated, is formed as a fan-shaped transmissive diffusion layer, and the other part is formed as an opaque phosphor layer. By the rotation of the phosphor wheel, B light, which has passed through the transmissive diffusion layer, and G light, which has been collected from the phosphor layer, can be utilized in a time-division manner.

A projection device using the above-described semiconductor light-emitting element is also disclosed, for example, in Jpn. Pat. Appln. KOKAI Publication No. 2014-164289.

FIG. 4 is a view illustrating a general activation sequence of a projector device using a semiconductor light-emitting element. Part (A) of FIG. 4 illustrates a detection pulse CWINDEX from a marker sensor that is provided to be opposed to a marker for synchronism detection which is attached to a circumferential surface of a phosphor wheel. Part (B) of FIG. 4 illustrates a turn-on pulse LD-ENBL which permits light emission of an LD that is a light-emitting element. Part (C) of FIG. 4 illustrates a current setting signal for setting a driving current of the LD.

At a time of activating the projection device, the current setting signal shown in part (C) of FIG. 4 is first turned on, thereby starting supply of power to the LD. Then, the phosphor wheel is rotated, and the detection pulse CWINDEX is obtained as shown in part (A) of FIG. 4.

Thereafter, as shown in part (B) of FIG. 4, at a timing t11, the turn-on pulse LD-ENBL is delivered to the LD. Thereby, since the current setting signal is already turned on, light emission is executed in accordance with this turn-on pulse, and a projection operation is started. Subsequently, at a timing t12, a search for an input signal is started. Thereby, if an input signal is delivered, the projection of video corresponding to this input signal is started.

In this activation sequence, as indicated by a broken-line area A11 in FIG. 4, since the turn-on pulse is output immediately after starting the rotation of the phosphor wheel, the projection operation is started before the phosphor wheel and the light emission of the LD are correctly synchronized. Consequently, such a problem arises that flickering occurs in the projected content.

In order to solve this problem, a method as illustrated in FIG. 5 is thinkable. In this method, the output of the turn-on pulse to the LD is delayed by a fixed time, for example, one second to two seconds, from the start of the rotation of the phosphor wheel. Thereby, in the state in which the rotation of the phosphor wheel is stabilized, the LD is correctly synchronized and driven to emit light.

In the activation method illustrated in FIG. 5, flickering of video can be suppressed by delaying the output of the turn-on pulse to the LD by the fixed time. However, since the start of the projection operation is delayed by that time, the advantage of the light source, for which the semiconductor light-emitting element that can immediately start projection after activation is used, would be lost.

Accordingly, it is an object of the invention to provide a projection device, a projection control method, and a program, capable of starting projection in a short time without causing flickering to occur.

SUMMARY OF THE INVENTION

According to one aspect of the present invention, a projection device includes a semiconductor light-emitting element, a rotary wheel configured to emit lights of a plurality of colors in a time-division manner by using light which the semiconductor light-emitting element emits, and a controller configured to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a circuit configuration of a projector device according to an embodiment of the present invention;

FIG. 2 is a view illustrating a first activation sequence according to the embodiment;

FIG. 3 is a view illustrating a second activation sequence according to the embodiment;

FIG. 4 is a view illustrating an activation sequence of a projector device using a general semiconductor light-emitting element; and FIG. 5 is a view illustrating an activation sequence of a projector device using a general semiconductor light-emitting element.

DETAILED DESCRIPTION OF THE INVENTION

Hereinafter, an embodiment in a case where the present invention is applied to a projector device of a digital light processing (DLP)® method will be described in detail with reference to the accompanying drawings.

(Configuration)

FIG. 1 is a block diagram illustrating a circuit configuration of a projector device 10 according to the embodiment. In FIG. 1, various video signals are input to an input unit 13 via input terminals 11 and 12. The input unit 13 includes an A/D converter and a video decoder. When an input video signal is an analog signal, the input unit 13 converts the analog signal to digital values, and then decodes the digital values to acquire video data of the primary colors of R, G and B. The input unit 13 outputs the acquired video data to a main microcomputer (controller) 14.

The main microcomputer (controller) 14 includes functions as a scaler unit and a micromirror device control IC (DMD controller) and cooperates with a sub-microcomputer 15 while communicating with the sub-microcomputer 15, thereby executing a control operation of the entirety of the projector device 10.

The main microcomputer (controller) 14 accepts a key operation from a power key 16, and drives a cooling fan 17 for cooling an LED and an LD (to be described later). In addition, the main microcomputer (controller) 14 outputs turn-on pulses LD-ENBL for the LD, which are synchronized with a projection operation, to the sub-microcomputer 15 and driver ICs 19 and 20 of a light source unit 18, and outputs a current setting signal to the driver ICs 19 and 20. Further, the main microcomputer (controller) 14 delivers video data, which corresponds to the primary colors of R, G and B, to a micromirror device 21.

In the light source unit 18, the driver IC 19 is a circuit for driving an LD 22 (B-LD) 22 which emits B light. The B light, which is emitted from the LD 22, is radiated on a plate surface of a phosphor wheel 23.

The phosphor wheel 23 is rotated and driven by a wheel motor (not shown). A part of the plate surface of the phosphor wheel 23 is formed as a fan-shaped transmissive diffusion part (B), and the other part of the plate surface is coated with a phosphor. By the rotation of the phosphor wheel, the B light from the LD 22 passes through the transmissive diffusion part, diffuses, and is radiated on the micromirror device 21, or the B light is radiated on the phosphor, and G light that is fluorescence from the phosphor is collected and radiated on the micromirror device 21.

A marker (not shown) is attached to a boundary position between the transmissive diffusion part and the phosphor-coated part at a peripheral end of the phosphor wheel 23. A marker sensor 24, which is disposed to be opposed to the marker, detects the passage of the marker, which is based on the rotation of the phosphor wheel 23, and the marker sensor 24 sends a detection pulse CWINDEX to the main microcomputer (controller) 14 and sub-microcomputer 15.

The sub-microcomputer 15 monitors whether correct synchronization is established by the detection pulse CWINDEX from the marker sensor 24 and the turn-on pulse LD-ENBL that is output from the main microcomputer (controller) 14, and outputs a monitoring result to the main microcomputer (controller) 14.

In addition, the driver IC 20 is a circuit for driving an LED (R-LED) 25 which emits R light. The R light, which is emitted from the LED 25, is directly radiated on the micromirror device 21.

The micromirror device 21 is configured such that very small movable mirrors, the number of which is equal to the number of pixels of, e.g. WXGA (1280×800 pixels), are arranged in a matrix. The individual very small movable mirrors are ON/OFF operated in accordance with the video data that is delivered from the main microcomputer (controller) 14, thereby displaying a primary-color image.

Primary-color lights of R, G and B are radiated from the light source unit 18 onto the micromirror device 21 in a time-division manner. Thereby, a primary-color light image is formed by reflective light in one direction. This light image is enlarged via a projection lens system 26, and is radiated on a screen or the like, which is a target of projection.

First Operation Example

Next, a first operation example of the above-described embodiment is described with reference to the accompanying drawings.

FIG. 2 is a view illustrating an activation sequence of the above-described projector device 10. Part (A) of FIG. 2 illustrates a detection pulse CWINDEX from the marker sensor 24. Part (B) of FIG. 2 illustrates a turn-on pulse LD-ENBL for permitting light emission, which is delivered to the driver IC 19, 20 from the main microcomputer (controller) 14 in order to drive the LD 22 and LED 25. Part (C) of FIG. 2 illustrates a current setting signal for setting a driving current of the LD 22 and LED 25.

At a time of activating the device, in the state in which the current setting signal shown in part (C) of FIG. 2 is kept in the OFF state, the phosphor wheel 23 is rotated and the detection pulse CWINDEX is obtained as shown in part (A) of FIG. 2.

Thereafter, as shown in part (B) of FIG. 2, at about the same time as the start of supply of the turn-on pulse LD-ENBL to the driver IC 19, 20, the measurement of a fixed time, which is preset in consideration of an individual difference, etc. of a wheel motor, etc. for the phosphor wheel 23, is started.

In addition, at a timing t31, a search for an input signal is started.

At this time of activation, as indicated by a broken-line area A31 in FIG. 2, since the turn-on pulse LD-ENBL is output immediately after starting the rotation of the phosphor wheel 23, the phosphor wheel 23 and the light emission timing of the LD 22 and LED 25 are not correctly synchronized.

Here, if there is an input signal as a result of the search for the input signal, a display operation based on video data at the micromirror device 21 is started. In addition, although the turn-on pulse LD-ENBL is supplied to the driver IC 19, 20, no light is emitted by the LD 22 and LED 25 by the current setting, and an actual projection operation is not performed. Thus, such a situation does not occur that flickering occurs due to asynchronism.

Thereafter, at a timing t32 when the measured fixed time has passed and the detection pulse CWINDEX and the turn-on pulse LD-ENBL are deemed to be exactly synchronized, the current setting signal from the main microcomputer (controller) 14 to the driver IC 19, 20 is turned on. Thereby, the LD 22 and LED 25 start light emission, and the actual projection operation is started.

The above-described fixed time is set to a time in which a safety coefficient is taken into account by considering an activation time difference, etc. of an individual wheel motor for rotating and driving the phosphor wheel 23, as described above. Thus, although the projection operation is delayed by that time, the search for the input signal can be started from a period in which the current setting is in the OFF state, after the turn-on process in which the turn-on pulse LD-ENBL was output. Therefore, the time before the projection is executed based on the input signal can be shortened.

Second Operation Example

Next, a second operation example of the above-described embodiment is described with reference to the accompanying drawings.

FIG. 3 is a view illustrating another activation sequence of the above-described projector device 10. Part (A) of FIG. 3 illustrates a detection pulse CWINDEX from the marker sensor 24. Part (B) of FIG. 3 illustrates a turn-on pulse LD-ENBL for permitting light emission, which is delivered to the driver IC 19, 20 from the main microcomputer (controller) 14 in order to drive the LD 22 and LED 25. Part (C) of FIG. 3 illustrates a current setting signal for setting a driving current of the LD 22 and LED 25.

At a time of activating the device, in the state in which the current setting signal shown in part (C) of FIG. 3 is kept in the OFF state, the phosphor wheel 23 is rotated and the detection pulse CWINDEX is obtained as shown in part (A) of FIG. 3.

Thereafter, as shown in part (B) of FIG. 3, the supply of the turn-on pulse LD-ENBL to the driver IC 19, 20 is started, and, at a timing t41, a search for an input signal is started.

At this time of activation, as indicated by a broken-line area A41 in FIG. 3, since the turn-on pulse LD-ENBL is output immediately after starting the rotation of the phosphor wheel 23, the phosphor wheel 23 and the light emission timing of the LD 22 and LED 25 are not correctly synchronized.

As described above, the sub-microcomputer 15 monitors the synchronization between the detection pulse CWINDEX and the turn-on pulse LD-ENBL. At a timing t42 when the sub-microcomputer 15 has determined that the asynchronous state in the area A41 ended and synchronism was established, the main microcomputer (controller) 14 turns on the current setting signal to the driver IC 19, 20, based on the communication with the sub-microcomputer 15, and starts the projection operation by starting light emission of the LD 22 and LED 25.

The search for the input signal is started from a period in which the current setting is in the OFF state, after the turn-on process in which the turn-on pulse LD-ENBL was output. In addition, the projection based on the input signal is performed immediately after the asynchronous area A41 ended and the establishment of synchronization was determined. Therefore, the time before starting the actual projection can be greatly shortened.

Advantageous Effects

As has been described above in detail, according to the present embodiment, at the beginning of the activation sequence, the period is set in which projection is performed with the driving current to the LD22 and LED 25 being set at zero, and thereby flickering is prevented, and the search for the input signal is started. Thus, the time from the projection start to the actual projection based on the input signal can be shortened.

In addition, in the above-described first operation example, after the passage of the fixed time from the output of the turn-on pulse to the LD 22 and LED 25, the main microcomputer (controller) 14 turns on the current setting to the LD 22 and LED 25 and starts the supply of power to the LD 22 and LED 25. Therefore, projection can be started in the stable state by taking into account the individual difference, etc. of the activation characteristic of the wheel motor for the phosphor wheel 23.

Furthermore, in the above-described second operation example, after the output of the turn-on pulse LD-ENBL to the LD 22 and LED 25, the main microcomputer (controller) 14 turns on the current setting to the LD 22 and LED 25 and starts the supply of power to the LD 22 and LED 25 immediately after the synchronism between the detection pulse CWINDEX from the marker sensor 24 and the turn-on pulse LD-ENBL has been determined. Therefore, projection can be started in a very short time.

In the meantime, in the above-described embodiment, the B light, which the LD 22 emits, is radiated on the phosphor wheel 23, and thereby the B light or G light is radiated on the micromirror device 21. In addition, the R light, which the LED 25 emits, is directly radiated on the micromirror element 21. Thus, the R light, G light and B light of the primary colors are radiated on the micromirror device 21 in a time-division manner. However, in the present invention, there are no restrictions to the kinds and emission colors of the semiconductor light-emitting element, or to the driving by only primary colors. For example, the invention is similarly applicable to a projection device which adopts such a driving method that a plurality of semiconductor light-emitting elements are simultaneously driven to emit lights, and light of a complementary color as a mixed color of plural primary colors may be radiated on a display element.

The present invention is not limited to the above-described embodiment. In practice, various modifications may be made without departing from the spirit of the invention. In addition, the functions executed in the embodiment may be implemented by being properly combined as much as possible. The above-described embodiments include inventions in various stages, and various inventions can be derived from proper combinations of structural elements disclosed herein. For example, even if some structural elements in all the structural elements disclosed in the embodiment are omitted, if the advantageous effect can be obtained, the structure without such structural elements can be derived as an invention.

What is claimed is:
1. A projection device comprising:
a semiconductor light-emitting element;
a rotary wheel configured to emit lights of a plurality of colors in a time-division manner by using light which the semiconductor light-emitting element emits; and
a controller configured to start, at a time of activating the projection device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state, wherein the controller is configured to start the supply of the power to the semiconductor light-emitting element, after passage of a preset time from the start of the output of the signal, which instructs the turn-on timing, to the semiconductor light-emitting element.

2. A projection control method for a device including a semiconductor light-emitting element and a rotary wheel configured to emit lights of a plurality of colors in a time-division manner by using light which the semiconductor light-emitting element emits, the projection control method comprising:

executing control to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state, wherein the supply of the power to the semiconductor light-emitting element is started after passage of a preset time from the start of the output of the signal, which instructs the turn-on timing, to the semiconductor light-emitting element.

3. A non-transitory computer readable storage medium having stored therein a program which is executed by a computer, which is incorporated in a device including a semiconductor light-emitting element and a rotary wheel configured to emit lights of a plurality of colors in a time-division manner by using light which the semiconductor light-emitting element emits, the program causing the computer to perform functions comprising:

executing control to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state, wherein the supply of the power to the semiconductor light-emitting element is started after passage of a preset time from the start of the output of the signal, which instructs the turn-on timing, to the semiconductor light-emitting element.

4. A projection device comprising:
a semiconductor light-emitting element;
a rotary wheel configured to emit lights of a plurality of colors in a time-division manner by using light which the semiconductor light-emitting element emits;
a controller configured to start, at a time of activating the projection device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state; and a detection unit configured to detect a rotational phase of the rotary wheel, wherein the controller is configured to start the supply of the power to the semiconductor light-emitting element, at a time point when the controller has determined synchronism between the rotational phase of the rotary wheel and the turn-on timing.

5. A projection control method for a device including a semiconductor light-emitting element and a rotary wheel configured to emit lights of a plurality of colors in a time-division manner by using light which the semiconductor light-emitting element emits, the projection control method comprising:

executing control to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state; and detecting a rotational phase of the rotary wheel, wherein the supply of the power to the semiconductor light-emitting element is started at a time point when synchronism between the rotational phase of the rotary wheel and the turn-on timing is determined.

6. A non-transitory computer readable storage medium having stored therein a program which is executed by a computer, which is incorporated in a device including a semiconductor light-emitting element and a rotary wheel configured to emit lights of a plurality of colors in a time-division manner by using light which the semiconductor light-emitting element emits, the program causing the computer to perform functions comprising:

executing control to start, at a time of activating the device, rotation of the rotary wheel and output of a signal, which instructs a turn-on timing, to the semiconductor light-emitting element, in a state in which supply of power to the semiconductor light-emitting element is stopped, and to start, thereafter, the supply of the power to the semiconductor light-emitting element, based on a predetermined condition relating to an activation state; and detecting a rotational phase of the rotary wheel, wherein the supply of the power to the semiconductor light-emitting element is started at a time point when synchronism between the rotational phase of the rotary wheel and the turn-on timing is determined.

* * * * *